United States Patent [19]
Fatehi et al.

[11] Patent Number: 5,434,701
[45] Date of Patent: Jul. 18, 1995

[54] ALL-OPTICAL INVERTER

[75] Inventors: Mohammad T. Fatehi; Clinton R. Giles, both of Middletown, N.J.

[73] Assignee: AT&T Corp., Murray Hill, N.J.

[21] Appl. No.: 168,291

[22] Filed: Dec. 17, 1993

[51] Int. Cl.⁶ .................................................. G02F 1/39
[52] U.S. Cl. ...................................... 359/341; 359/244
[58] Field of Search .................................. 359/341, 244

[56] References Cited

U.S. PATENT DOCUMENTS

| | | | |
|---|---|---|---|
| 5,088,095 | 2/1992 | Zirngibl | 372/6 |
| 5,128,800 | 7/1992 | Zirngibl | 359/341 |
| 5,155,780 | 10/1992 | Zirnigibl | 385/27 |
| 5,229,876 | 7/1993 | Fatehi et al. | 359/160 |
| 5,239,607 | 8/1993 | da Silva et al. | 359/341 X |
| 5,268,786 | 12/1993 | Matsushita et al. | 359/341 |

OTHER PUBLICATIONS

"Gain Control In Erbium–Doped Fibre Amplifiers By An All–Optical Feedback Loop", *Electronics Letters*, 28 Mar. 1991, vol. 27, No. 7 pp. 560–561.

*Primary Examiner*—Mark Hellner
*Attorney, Agent, or Firm*—Mark K. Young

[57] ABSTRACT

An all-optical inverter device is achieved by employing an optical amplifier having a optical filter positioned in a feedback loop arranged so that an output signal of the optical amplifier having a first characteristic wavelength is inversely related to an input signal to the optical amplifier having a second characteristic wavelength.

30 Claims, 2 Drawing Sheets

ALL-OPTICAL INVERTER

CROSS-REFERENCE TO RELATED APPLICATION

U.S. Pat. No. 5,224,876 was filed concurrently herewith.

1. Technical Field

This invention relates generally to optics and, more particularly to an all-optical guided-wave inverter device.

2. Background of the Invention

All-optical signal processing and telecommunication devices are presently being developed to exploit the high speed, immunity to electromagnetic interference, very large bandwidth and capacity, and low loss, distortion and crosstalk characteristics of guidedwave lightwave technology, particularly in forms using optical fiber. "All optical" means the devices not only have optical inputs and outputs, but all intermediate signal processing is accomplished optically rather than electrically. All-optical devices are more desirable than opto-electrical devices which convert an optical signal into an electrical analog because a signal remaining in the single optical domain can make best use of the inherent advantages of lightwave technology. In addition, all-optical systems generally require less components and are less complex than their opto-electric counterparts performing similar functions.

One of the first areas to develop in all-optical signal processing was optical amplification with the advent of semiconductor optical amplifiers and rare-earth-doped amplifying optical fibers such as erbium-doped optical fibers. These amplifying fibers, known as erbium-doped fiber amplifiers (EDFAs), exhibit low noise, relatively large, polarization-independent bandwidth, reduced cross-talk, low insertion loss, and are relatively inexpensive to fabricate. All-optical amplifiers offer substantial performance advantages over competing opto-electrical amplifier technology. In all-optical amplifiers, the output signal is amplified form of the input signal, where an increase in the magnitude of the input signal results in an increase in the magnitude of the output signal.

Clearly, there is a need for more all-optical devices, beyond optical amplification, to further exploit the inherent advantages of lightwave technology in both analog and digital applications. For example, while electrical inverter devices have existed for many years, an all-optical inverter device has not yet been realized. In an inverter device, the output signal is inversely related to the input signal so that an increase in magnitude of the input signal magnitude results in a decrease in the magnitude of the output signal.

SUMMARY OF THE INVENTION

An all-optical inverter device is achieved, in accordance with the principles of the invention, by employing an optical amplifier having a optical filter positioned in a feedback loop arranged so that an output signal of the optical amplifier having a first characteristic wavelength is inversely related to an input signal to the optical amplifier having a second characteristic wavelength.

In an illustrative arrangement of elements forming the all-optical inverter device, the all-optical inverter outputs an optical signal, at a first characteristic wavelength, when no optical signal is received at the input, and outputs a null signal (i.e. no signal) when an optical signal, having a second characteristic wavelength which is at least nominally different from the first characteristic wavelength, is received at the input.

In another illustrative arrangement of elements forming the all-optical inverter device, the all-optical inverter outputs an optical signal, at a first characteristic wavelength, when no optical signal is received at the input, and outputs either an amplified signal at a second characteristic wavelength, or a two-component signal having both first and second characteristic wavelengths when an optical signal having the second characteristic wavelength is received at the input.

The all-optical inverter device may be advantageously used in a variety of different applications. For example, the all-optical inverter may be advantageously used as an all-optical logic element in digital applications; as an analog fault locator in long-haul optical transmission systems; and as a combination optical pump and signal amplifier as a component of a wavelength converter for use in wavelength division multiplexed (WDM) switching systems.

DETAILED DESCRIPTION

Figure 1:
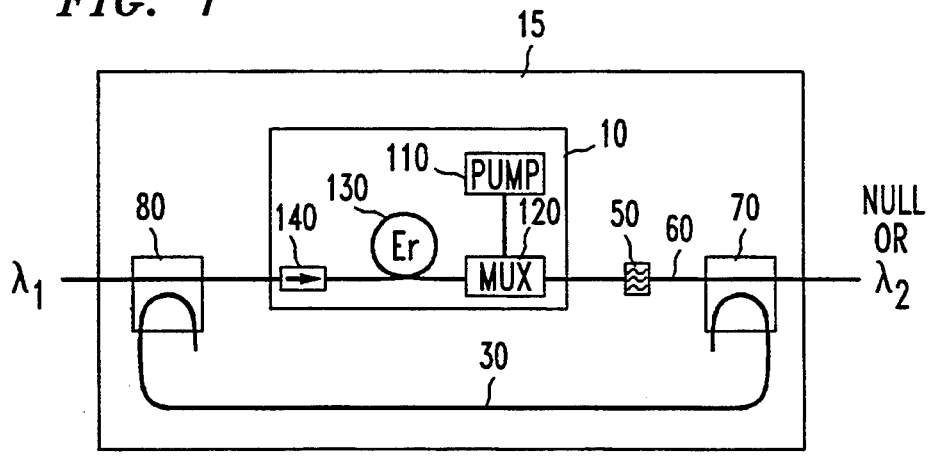
FIG. 1 shows a simplified schematic representation of a first illustrative arrangement of elements forming an all-optical inverter device in accordance with an aspect of the invention.

FIG. 1 shows a schematic representation of a first illustrative arrangement of elements forming all-optical inverter 15 in accordance with the invention. Feedback path 30, comprised of an undoped optical fiber, couples the output and input of EDFA 10. It will be appreciated by those skilled in the art that it may be desirable, in some applications of the invention, to use a rare-earth-doped fiber in feedback path 30 acting as a saturable attenuator. The advantageous use of attenuators is described in further detail below.

In this illustrative arrangement, EDFA 10 consists of pump 110, multiplexer 120, erbium-doped fiber 130, and optical isolator 140 arranged such that the light from pump 110 travels counter-directionally with the signal. Each of these components and the functions employed therein are well known in the art. In some applications of the invention, it may be desirable to arrange the components in EDFA 10 in such a way that the light from pump 110 travels co-directionally, or hi-directionally with the signal. Bandpass filter 50 is positioned in forward path 60 between the output of EDFA 10 and output optical coupler 70. Output optical coupler 70 couples a predetermined portion of the signal propagating in forward path 60 to feedback path 30. Input optical coupler 80 couples a predetermined portion of the signal propagating in feedback path 30 to the input of EDFA 10.

In operation, when there is no optical signal present at the input to EDFA 10, the amplified spontaneous emission (ASE) from EDFA 10 is filtered at wavelength $\lambda_2$ by optical bandpass filter 50 as the ASE propagates along forward path 60. ASE is generated by EDFA 10 from the amplified light produced by the spontaneous emission of excited erbium ions from erbium-doped fiber 130. A portion of the filtered ASE is coupled from the output of EDFA 10 through output optical coupler 70 to feedback loop 30, where it is then re-injected through input optical coupler 80 as a feedback signal to EDFA 10. This feedback signal is sufficient to cause stimulated emission in EDFA 10 which results in self-sustaining lasing output by all-optical inverter 15 at wavelength $\lambda_2$.

When an optical input signal at wavelength $\lambda_1$ (which is at least nominally different from $\lambda_2$) is present at the input of EDFA 10, EDFA 10 amplifies a signal having wavelength components $\lambda_1$ and $\lambda_2$. Since the overall gain of all-optical inverter 15 is fixed by the length of EDFA 10, as the magnitude of the input signal at wavelength $\lambda_1$ increases, the magnitude of the output signal at wavelength $\lambda_2$ proportionally decreases until saturation of EDFA 10 occurs. Saturation reduces the gain through EDFA 10 below the threshold necessary for lasing at wavelength $\lambda_2$, at which point all-optical inverter 15 emits a null signal (i.e., no signal). Optical bandpass filter 50, which is tuned to pass wavelength $\lambda_2$, and positioned at the output of EDFA 10, blocks the amplified input signal at wavelength $\lambda_1$ from propagating beyond the all-optical inverter. Because the magnitude of the optical signal output by EDFA 10 at wavelength $\lambda_2$ is inversely proportional to the magnitude of the optical input signal at wavelength $\lambda_1$, an all-optical inverter is herein achieved.

The following mathematical exposition should prove useful to one skilled in the art in the understanding of the detailed operation of the invention. The input and output photon fluxes to erbium-doped fiber 130 are related through coupled implicit equations:

$$q_{\lambda_i}^{out} = q_{\lambda_i}^{in} \exp\left[\frac{(\alpha_{\lambda_i} + g_{\lambda_i}^*)}{\zeta}(q^{in} - q^{out}) - \alpha_{\lambda_i} L\right] \quad i = 1,2,p \tag{1}$$

and $$q^{in,out} = \sum_i q_{\lambda_i}^{in,out} \tag{2}$$

where $\lambda_1$ is the wavelength of the input signal, $\lambda_2$ is the wavelength of the output signal, $\lambda_p$ is the wavelength of the pump light in EDFA 10, q are the photon fluxes entering and exiting erbium-doped fiber 130, $\alpha$ and $g^*$ are absorption and emission coefficients at the control and pump wavelengths, respectively, $\zeta$ is a saturation parameter, and L is the length of erbium-doped fiber 130.

Feedback path 30 fixes the relationship between input and output of EDFA 10 at wavelength $\lambda_2$:

$$q_{\lambda_2}^{in} = T_{in} T_{out} T_f F_{in} F_{out} q_{\lambda_2}^{out} = T_1 F_{in} F_{out} q_{\lambda_2}^{out} \tag{3}$$

where $T_{in}$ and $T_{out}$ are the transmissivity of the optical components at the input and output of EDFA 10, and $T_f$ is the transmissivity of feedback path 30, $T_1 = T_{in} T_{out} T_f$, and $F_{in}$ and $F_{out}$ are the coupling ratios of input optical coupler 80 and output optical coupler 70, respectively. Equations (1) to (3) reduce to an explicit equation for the output of EDFA 10, valid above the lasing threshold, that depends linearly on the pump and input signal powers:

$$Q_{\lambda_2}^{out} = \frac{T_{out}(1-F_{out})}{1-T_1 F_{in} F_{out}}\left[Q_{\lambda_2}^{in}(1-H_{\lambda_p}) + (1-F_{in})T_{in}Q_{\lambda_1}^{in}(1-H_{\lambda_1})\frac{\zeta}{\alpha_{\lambda_2}+g_{\lambda_2}^*}(\alpha_{\lambda_2}L - \ln(T_1 F_{in} F_{out}))\right] \tag{4}$$

where the transfer function $H_{\lambda_1}$ is defined as:

$$H_{\lambda_i} = \frac{\alpha_{\lambda_i}+g_{\lambda_i}^*}{\alpha_{\lambda_2}+g_{\lambda_2}^*}(\alpha_{\lambda_2}L - \ln(T_1 F_{in} F_{out})) - \alpha_{\lambda_i} L \quad i = 1,p \tag{5}$$

and $Q_{\lambda_1}$ are the photon fluxes entering and exiting EDFA 10. For equations (4) and (5) to be valid, EDFA 10 must be operating as a laser which requires that total gain through the combination of forward path 60 and feedback path 30 be equal or greater than unity. It will be apparent to those skilled in the art that the gain through the combination of forward path 60 and feedback path 30 may be readily controlled by changing the fraction of light propagating in feedback path 30 by changing the coupling ratios of output coupler and input coupler 80. Alternatively, it may be desirable to include a controllable attenuation element positioned in feedback path 30 to control the gain through the combination of forward path 60 and feedback path 30.

Figure 2:
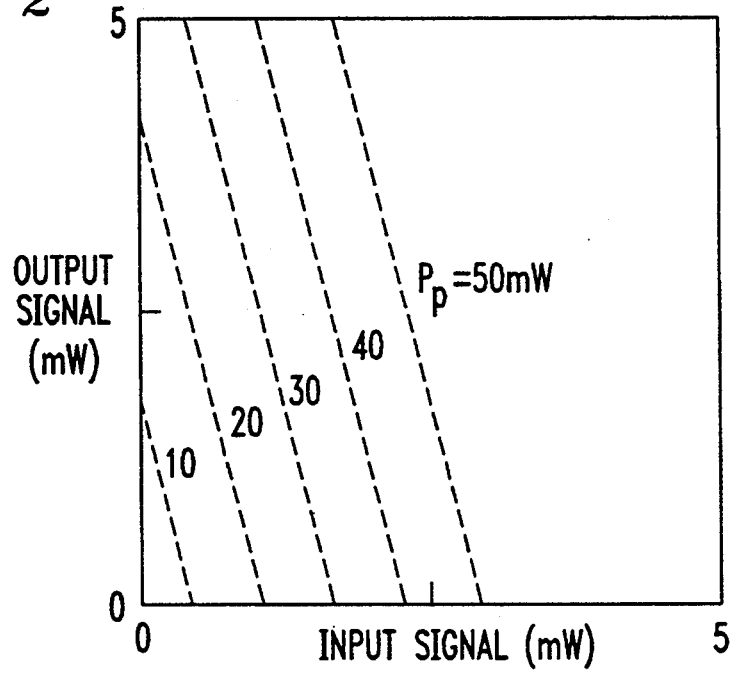
FIG. 2 shows a graph of the calculated output power of the all-optical inverter device of FIG. 1 as a function of the input signal power for various levels of pump power.

FIG. 2 shows a graph of equation (4) where the calculated output power of EDFA is plotted as a function of input signal power under the following illustrative conditions:

$\lambda_p = 980$ nm $\lambda_1 = 1560$ nm $T_{in} = T_{out} = 0.8$ $T_f = 0.5$ $F_1 = F_2 = 0.5$ $L = 13$ m $\zeta = 1.5 \times 10^{15}$ m$^{-1}$s$^{-1}$ $\alpha = 0.38$ m$^{-1}$ $g^* = 0.62$ m$^{-1}$ The slope (or "gain") of the transfer function $H_{\lambda_1}$ is independent of pump power and is determined by principally by the transmissivity terms, $T_{in}$, $T_{out}$, and $T_f$, and coupling ratios $F_{in}$ and $F_{out}$. Indeed, where $\lambda_1 = \lambda_2$, $\alpha_{\lambda_1} = \alpha_{\lambda_2}$, and $g_{\lambda_1}^* = g_{\lambda_2}^*$, the gain transfer function reduces to:

$$\frac{dQ_{\lambda 2}}{dQ_{\lambda 1}} = -\frac{(1-F_{in})(1-F_{out})}{T_f F_{in} F_{out}} \qquad (6)$$

Thus, high transfer function gain is achieved with weak feedback characterized by a small $T_f F_{in} F_{out}$ term. This results because EDFA 10 is clamped to high gain so that the input signal also experiences high gain which readily saturates the output power of EDFA 10. It will be readily appreciated to those skilled in the art that the $T_f F_{in} F_{out}$ term may be advantageously adjusted to alter the gain characteristics of all-optical all-optical inverter 15 by changing, for example, transmissivity $T_f$ of the feedback path 30 by incorporating a controllable attenuation element into feedback path 30. Alternatively, it may also be desirable to incorporate other elements into feedback path 30 such as saturable or controllable absorbers, and modulators. As will be appreciated by those skilled in the art, when the slope of transfer function $H_{\lambda 1} = 1$, all-optical inverter 15 operates as an analog all-optical inverter where the magnitude of the output signal is directly inversely proportional to the magnitude of the input signal.

Figure 3:
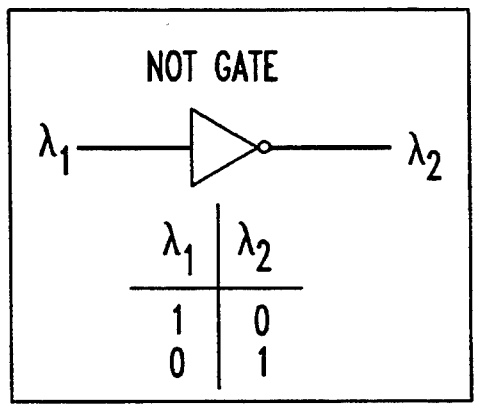
FIG. 3 shows an illustrative diagram and truth table of an application of the first illustrative arrangement.

Such a first illustrative arrangement may be advantageously used as an all-optical logic element in digital applications. If the input signal at wavelength $\lambda_1$ is selected to have sufficient magnitude to saturate EDFA 10, then all-optical inverter 15 functions as a logical NOT gate by outputting a null signal when the input signal is present, and by outputting a signal at wavelength $\lambda_2$ when no input signal is present. The NOT gate is conveniently represented by the symbol known in the art shown in FIG. 3 and operates according to the truth table below:

| $\lambda_1$ | $\lambda_2$ |
|---|---|
| 1 | 0 |
| 0 | 1 |

Figure 4:
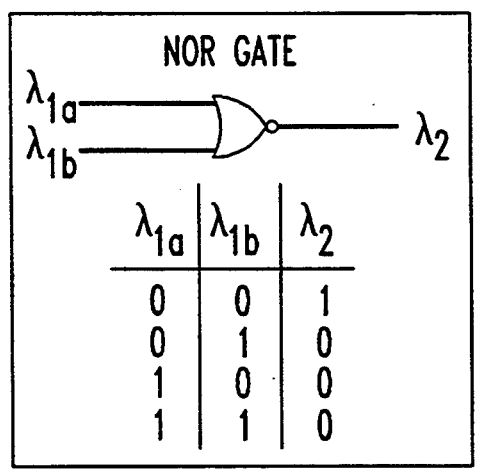
FIG. 4 shows an illustrative diagram and truth table of an application of the first illustrative arrangement.

Two signals having wavelengths of $\lambda_{1a}$ and $\lambda_{1b}$ respectively, where $\lambda_{1a}$ and $\lambda_{1b}$ may be or may not be equal, may be coupled to the input of all-optical inverter 15 (FIG. 1) using, for example, a 3 dB optical coupler. All-optical inverter 15 then functions as an all-optical NOR gate, conveniently represented by the symbol known in the art shown in FIG. 4, according to the truth table shown below:

| $\lambda_{1a}$ | $\lambda_{1b}$ | $\lambda_2$ |
|---|---|---|
| 0 | 0 | 1 |
| 0 | 1 | 0 |
| 1 | 0 | 0 |
| 1 | 1 | 0 |

The presence of either signal $\lambda_{1a}$ or $\lambda_{1b}$ at the input to all-optical inverter 15 (FIG. 1) saturates EDFA 10 (FIG. 1) to prevent it from lasing and producing an output signal at wavelength $\lambda_2$. Since a NOR gate is logically complete, it will be apparent to those skilled in the art that all-optical inverter 15, in accordance with an aspect of the invention, may be used in various ways to implement all 16 functions of two binary input variables.

Figure 5:
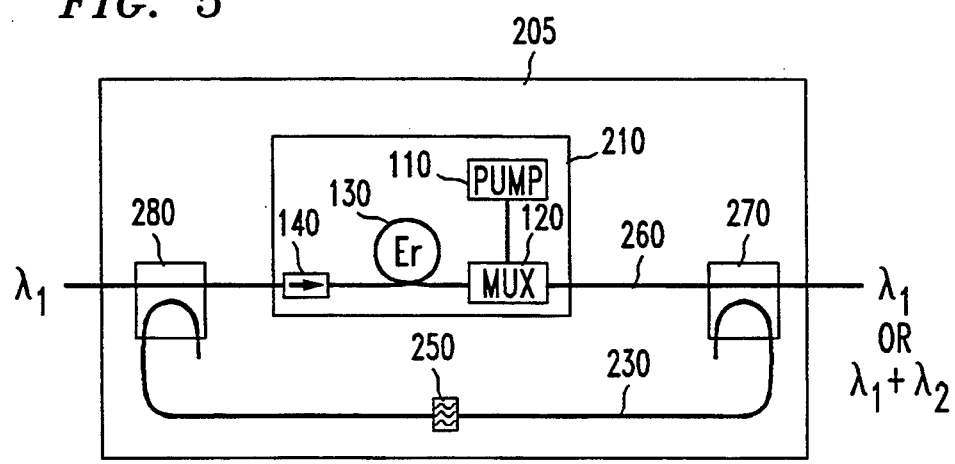
FIG. 5 shows a simplified schematic representation of a second illustrative arrangement of elements forming an all-optical inverter device in accordance with an aspect of the invention.

A second illustrative arrangement is shown in FIG. 5 where optical bandpass filter 250 is positioned in loop 230 rather than between the output of EDFA 210 and output optical coupler 270 on forward path 260. This arrangement will allow all-optical inverter 205 to advantageously function as a broadband optical amplifier in, for example, analog applications. Lasing can occur in this illustrative arrangement as described above because optical bandpass filter 250 filters the ASE generated by EDFA 210 at wavelength $\lambda_2$. However, since output coupler 270 is positioned between the output of EDFA 210 and optical bandpass filter 250, a portion of the amplified control signal is allowed to be output from all-optical inverter 205. Indeed, when the amplitude of the input signal is less than that necessary to saturate EDFA 210, all-optical inverter 205 outputs a signal with two components, with the first component having wavelength $\lambda_1$ and the second component having wavelength $\lambda_2$. If the amplitude of the input signal increases to a level sufficient to saturate EDFA 210, then the gain though EDFA 210 is reduced below the threshold necessary for lasing at output wavelength $\lambda_2$ and only the input signal at wavelength $\lambda_1$ is output by all-optical inverter 205.

Figure 6:
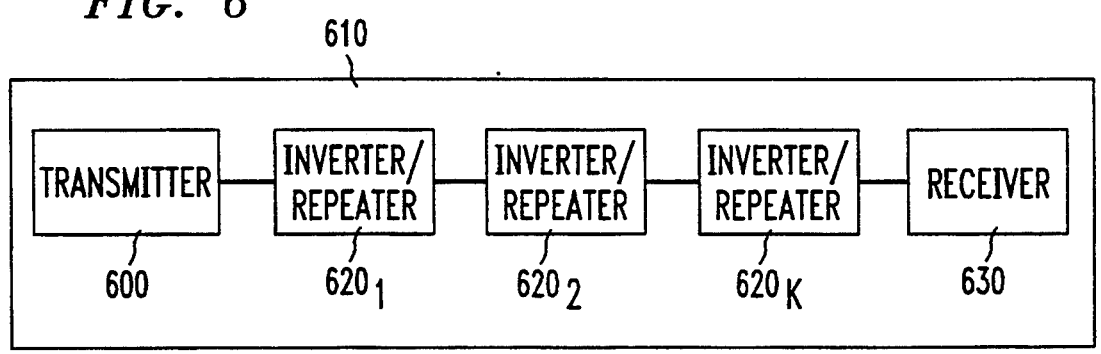
FIG. 6 shows a simplified block diagram of an application of the second illustrative arrangement.

An example of an analog application of the invention is the use of the all-optical inverter as a fault locating repeater in long-haul lightwave transmission systems as shown in FIG. 6. In point-to-point lightwave transmission system 610, there are positioned between transmitter 600 and receiver 630 a number of all-optical inverter/repeaters $620_1 \ldots _k$ which utilize the principles of the invention. In this example, three exemplary all-optical inverter/repeaters are shown. Of course, the number of all-optical inverter/repeaters used in a given point-to-point lightwave transmission system would depend on a number of factors that are well known to those skilled in the art. Each all-optical inverter/repeater is identified by tuning bandpass filter 250 (FIG. 5) in each feedback path 230 (FIG. 5) to a distinct identifying wavelength. In the event of a signal loss, by a repeater failure, line cut or some other fault, the optical signal received at receiver 630 would originate from the first unsaturated all-optical inverter/repeater acting as a laser. Other all-optical inverter/repeaters positioned further down the transmission line would remain saturated by the optical signal generated by this unsaturated all-optical inverter/repeater and the signal wavelength at receiver 630 would identify the location of the fault. Modulation of the laser feedback, for example, by use of a controllable attenuation element positioned in feedback path 230 (FIG. 5) may be advantageously employed to generate a telemetry signal for transmission to a remote location. Alternatively, a telemetry signal may be generated by modulating pump 310 in EDFA 210 (FIG. 5) according to methods known in the art.

The second illustrative arrangement of the invention may also be advantageously used as a component of a wavelength converter. As is known by those with skill in the art, wavelength converters may be used in transmission methods utilizing optical nonlinearities which are typically implemented with such techniques as four-wave mixing between a separate optical pump source and signal amplifier. Although not presented in detail herein, four-wave mixing is being investigated as a promising means of combating chromatic dispersion and controlling deleterious nonlinear effects. Advantageously, the all-optical inverter, acting as both the optical pump source and amplifier, can be used in a system using four-wave mixing with a reduced number of elements (and hence, less complexity). As described above when referring to FIG. 2, when an input signal at wavelength $\lambda_1$ is input to all-optical all-optical inverter 205 at an amplitude below that needed to saturate EDFA 210, a signal with two components having wavelengths $\lambda_1$ and $\lambda_2$ are output by all-optical all-optical inverter 205. This two-component signal may be optimized to achieve high nonlinear interaction in a wavelength converter where the conversion efficiency is proportion to $P_p{}^2 P_{signal}$, where $P_p$ is the pump power and $P_{signal}$ is the control signal power. Thus, the highest conversion is obtained where approximately two-thirds of the output power of all-optical inverter 205 is at the output wavelength $\lambda_2$, and approximately one-third is at the control wavelength $\lambda_1$.

The above-described arrangements are, of course, merely illustrative of the application of the principles of the invention. Other arrangements may be devised by those skilled in the art without departing from the spirit or scope of the invention. For example, it will be apparent to those skilled in the art that a semiconductor optical amplifier may be advantageously employed in place of EDFA 10 in FIG. 1 and EDFA 210 in FIG. 5 to allow faster response for the purpose of integrating the all-optical inverter in a photonic integrated circuit chip.

We claim:

1. Apparatus for use as an inverter comprising:
    amplifying means having at least an input an an output for amplifying a first optical signal having a predetermined magnitude and a wavelength substantially equal to $\lambda_1$ supplied to said input of said amplifying means;
    means coupled to said input and said output of said amplifying means for maintaining said optical signal within the optical domain in said amplifying means; and
    means responsive to a first optical signal having a wavelength substantially equal to $\lambda_1$ for supplying as an output a second optical signal having a predetermined magnitude and a wavelength substantially equal to $\lambda_2$ where $\lambda_1$ and $\lambda_2$ are at least nominally different and said magnitude of said second optical signal is inversely related to said magnitude of said first optical signal.

2. Apparatus for use as an inverter comprising:
    amplifying means having at least an input and output for amplifying an optical signal;
    feedback means having a signal path for coupling said output to said input of said amplifier means so that an optical signal having a wavelength substantially equal to $\lambda_2$ propagating in said signal path and received at said input causes said amplifying means to have at least a first state of operation;
    wavelength selective means disposed in said signal path in said feedback means for limiting a signal traveling in said signal path to a wavelength substantially equal to $\lambda_2$; and
    means coupled to said input of said amplifying means for controlling said amplifying means so that a signal having a wavelength substantially equal to $\lambda_1$ received at said input causes said amplifying means to have at least a second state of operation.

3. The apparatus as defined in claim 2 wherein said first state of operation includes generating an output signal at a wavelength substantially equal to $\lambda_2$.

4. The apparatus as defined in claim 2 wherein said second state of operation includes generating an output signal at a wavelength substantially equal to $\lambda_2$.

5. The apparatus as defined in claim 2 wherein said second state of operation includes generating an output signal having first and second components where said first component has a wavelength substantially equal to $\lambda_1$ and said second component has a wavelength substantially equal to $\lambda_2$.

6. The apparatus as defined in claim 2 wherein said second state of operation includes generating a null output signal.

7. The apparatus as defined in claim 2 wherein said amplifying means comprises an erbium-doped fiber amplifier.

8. The apparatus as defined in claim 2 wherein said amplifying means comprises a semiconductor optical amplifier.

9. The apparatus as defined in claim 2 wherein said feedback means comprises an optical fiber.

10. The apparatus as defined in claim 9 wherein said feedback means further includes first optical coupler means disposed in said signal path between said output of said amplifying means and said optical fiber for coupling said optical fiber to said output of said amplifying means, and second optical coupler means disposed in said signal path between said optical fiber and said input of said amplifying means for coupling said optical fiber to said input of said amplifying means.

11. The apparatus as defined in claim 9 wherein said wavelength selective means is disposed in said signal path between said output of said amplifying means and said first optical coupler means.

12. The apparatus as defined in claim 9 wherein said wavelength selective means is disposed in said signal path between said first and second optical coupler means.

13. The apparatus as defined in claim 9 wherein said feedback means includes means for modulating an optical signal propagating on said signal path to generate a telemetry signal.

14. A method comprising the steps of:
    amplifying a first optical signal having a wavelength substantially equal to $\lambda_1$ supplied to an input of an optical amplifier having at least an input and an output;
    coupling said input and said output of said optical amplifier so that said optical signal is maintained within the optical domain in said optical amplifier; and
    supplying as an output a second optical signal having a wavelength substantially equal to $\lambda_2$ where said second optical signal is inversely related to said first optical signal having a wavelength substantially equal to $\lambda_1$.

15. A method comprising the steps of:
    amplifying an optical signal employing amplifying means having at least an input and an output;
    coupling said output of said amplifying means to said input of said amplifying means employing feedback means having a signal path so that an optical signal having a wavelength substantially equal to $\lambda_2$ propagating in said signal path and received at said input causes said amplifying means to have at least a first state of operation;
    limiting a signal traveling in said signal path to a wavelength substantially equal to $\lambda_2$; and
    controlling said amplifying means so that a signal having a wavelength substantially equal to $\lambda_1$ received at said input causes said amplifying means to have at least a second state of operation.

16. The method as defined in claim 15 wherein said first state of operation includes generating an output signal at a wavelength substantially equal to $\lambda_2$.

17. The method as defined in claim 15 wherein said second state of operation includes generating an output signal at a wavelength substantially equal to $\lambda_1$.

18. The method as defined in claim 15 wherein said second state of operation includes generating an output signal having first and second components where said first component has a wavelength substantially equal to $\lambda_1$ and said second component has a wavelength substantially equal to $\lambda_2$.

19. The method as defined in claim 15 wherein said second state of operation includes generating a null output signal.

20. The method as defined in claim 15 wherein said step of amplifying employs amplifying means comprising an erbium-doped fiber amplifier.

21. The method as defined in claim 18 wherein said step of amplifying employs amplifying means comprising a semiconductor optical amplifier.

22. The method as defined in claim 18 wherein said step of coupling employs feedback means comprising an optical fiber.

23. The method as defined in claim 19 wherein said feedback means further includes first optical coupler means disposed of in said signal path between said output of said amplifying means and said optical fiber for coupling said optical fiber to said output of said amplifying means, and second optical coupler means disposed of in said signal path between said optical fiber and said input of said amplifying means for coupling said optical fiber to said input of said amplifying means.

24. The method as defined in claim 19 wherein said step of limiting employs wavelength selective means disposed of in said signal path between said output of said amplifying means and said first optical coupler means.

25. The method as defined in claim 19 wherein said step of limiting employs wavelength selective means disposed of in said signal path between said first and second optical coupler means.

26. The method as defined in claim 19 wherein said feedback means includes means for modulating an optical signal propagating on said signal path to generate a telemetry signal.

27. The apparatus as defined in claim 1 wherein said amplifying means comprises an erbium-doped fiber amplifier.

28. The apparatus as defined in claim 1 wherein said amplifying means comprises a semiconductor optical amplifier.

29. The method as defined in claim 15 wherein said step of amplifying employs amplifying means comprising an erbium-doped fiber amplifier.

30. The method as defined in claim 15 wherein said step of amplifying employs amplifying means comprising a semiconductor optical amplifier.

* * * * *

UNITED STATES PATENT AND TRADEMARK OFFICE
CERTIFICATE OF CORRECTION

PATENT NO. : 5,434,701
DATED : July 18, 1995
INVENTOR(S) : Mohammad T. Fatehi et al.

It is certified that error appears in the above-identified patent and that said Letters Patent is hereby corrected as shown below:

In Column 7, Claim 4, Line 68, change "$\lambda_2$" to --$\lambda_1$--.

Signed and Sealed this

Twenty-ninth Day of September, 1998

Attest:

BRUCE LEHMAN

*Attesting Officer*  *Commissioner of Patents and Trademarks*